(12) United States Patent
Tohyama et al.

(10) Patent No.: US 7,996,213 B2
(45) Date of Patent: Aug. 9, 2011

(54) METHOD AND APPARATUS FOR ESTIMATING DEGREE OF SIMILARITY BETWEEN VOICES

(75) Inventors: Mikio Tohyama, Kanagawa (JP); Michiko Kazama, Tokyo (JP); Satoru Goto, Kawasaki (JP); Takehiko Kawahara, Hamamatsu (JP); Yasuo Yoshioka, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1143 days.

(21) Appl. No.: 11/726,077

(22) Filed: Mar. 20, 2007

(65) Prior Publication Data

US 2007/0225979 A1   Sep. 27, 2007

(30) Foreign Application Priority Data

Mar. 24, 2006   (JP) ................. 2006-081853

(51) Int. Cl.
  *G10L 15/00* (2006.01)
  *G10L 17/00* (2006.01)
  *G10L 21/00* (2006.01)
(52) U.S. Cl. .............. 704/206; 704/241; 704/250
(58) Field of Classification Search .......... 704/206, 704/250
  See application file for complete search history.

(56) References Cited

U.S. PATENT DOCUMENTS

| 4,720,863 A | 1/1988 | Li et al. |
| 5,095,508 A | 3/1992 | Fujimoto et al. |
| 5,583,961 A | 12/1996 | Pawlewski et al. |

FOREIGN PATENT DOCUMENTS

| JP | 03-266898 A | 11/1991 |
| JP | 2003-177787 A | 6/2003 |
| TW | 546633 B | 8/2003 |

OTHER PUBLICATIONS

Notice of Rejection mailed Mar. 23, 2010, for JP Application No. 2006-081853, with English Translation, four pages.
Taiwan Search Report completed Mar. 5, 2010, for TW Application No. 096109552, received by Foreign Associate Suzuki International May 27, 2010, two pages.
Kazama, M., et al., Talker Identification Using Narrow-Band Envelope Correlation Matrix, Institute of Electronics, Information and Communication Engineers, Mar. 2002.
Li, K.-P. and Hughes, G.W., Talker Differences as They Appear In Correlation Matrices of Continuous Speech Spectra, J. Acoust. Soc. Am., Apr. 1974, vol. 55—No. 4.

*Primary Examiner* — Justin W Rider
(74) *Attorney, Agent, or Firm* — Morrison & Foerster LLP

(57) ABSTRACT

A similarity degree estimation method is performed by two processes. In a first process, an inter-band correlation matrix is created from spectral data of an input voice such that the spectral data are divided into a plurality of discrete bands which are separated from each other with spaces therebetween along a frequency axis, a plurality of envelope components of the spectral data are obtained from the plurality of the discrete bands, and elements of the inter-band correlation matrix are correlation values between the respective envelope components of the input voice. In a second process, a degree of similarity is calculated between a pair of input voices to be compared with each other by using respective inter-band correlation matrices obtained for the pair of the input voices through the inter-band correlation matrix creation process.

9 Claims, 9 Drawing Sheets

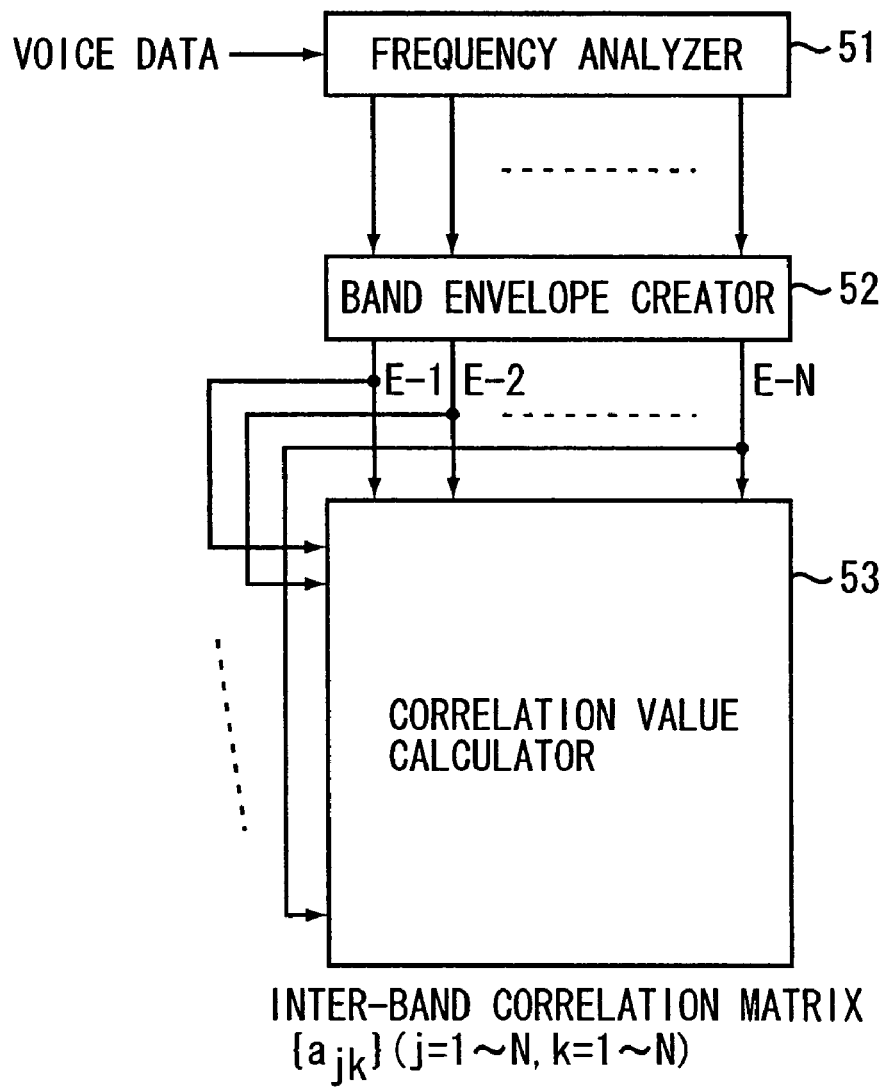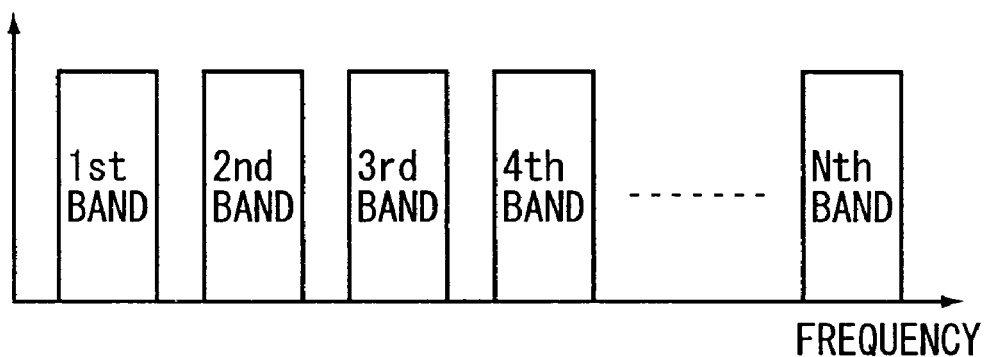

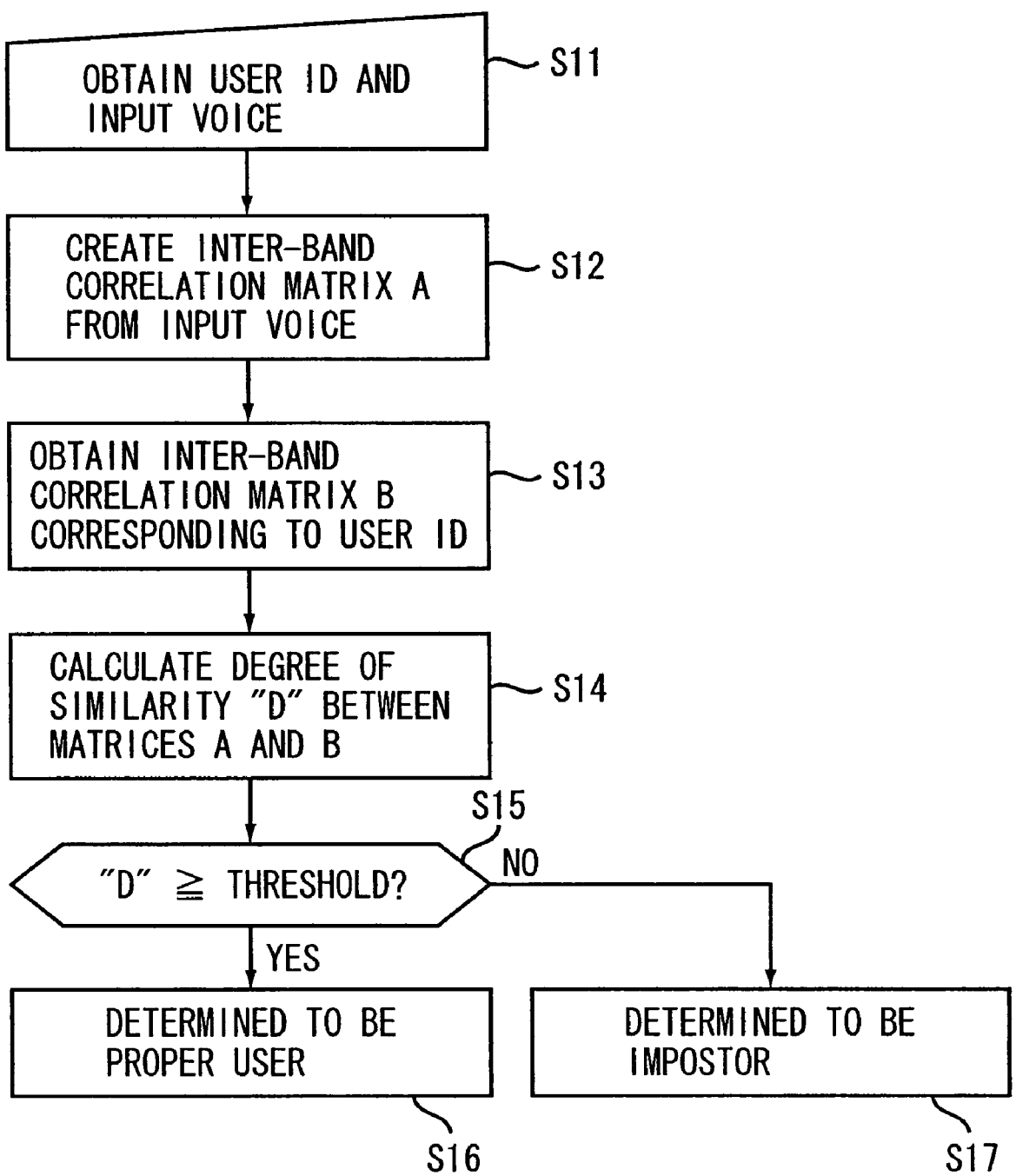

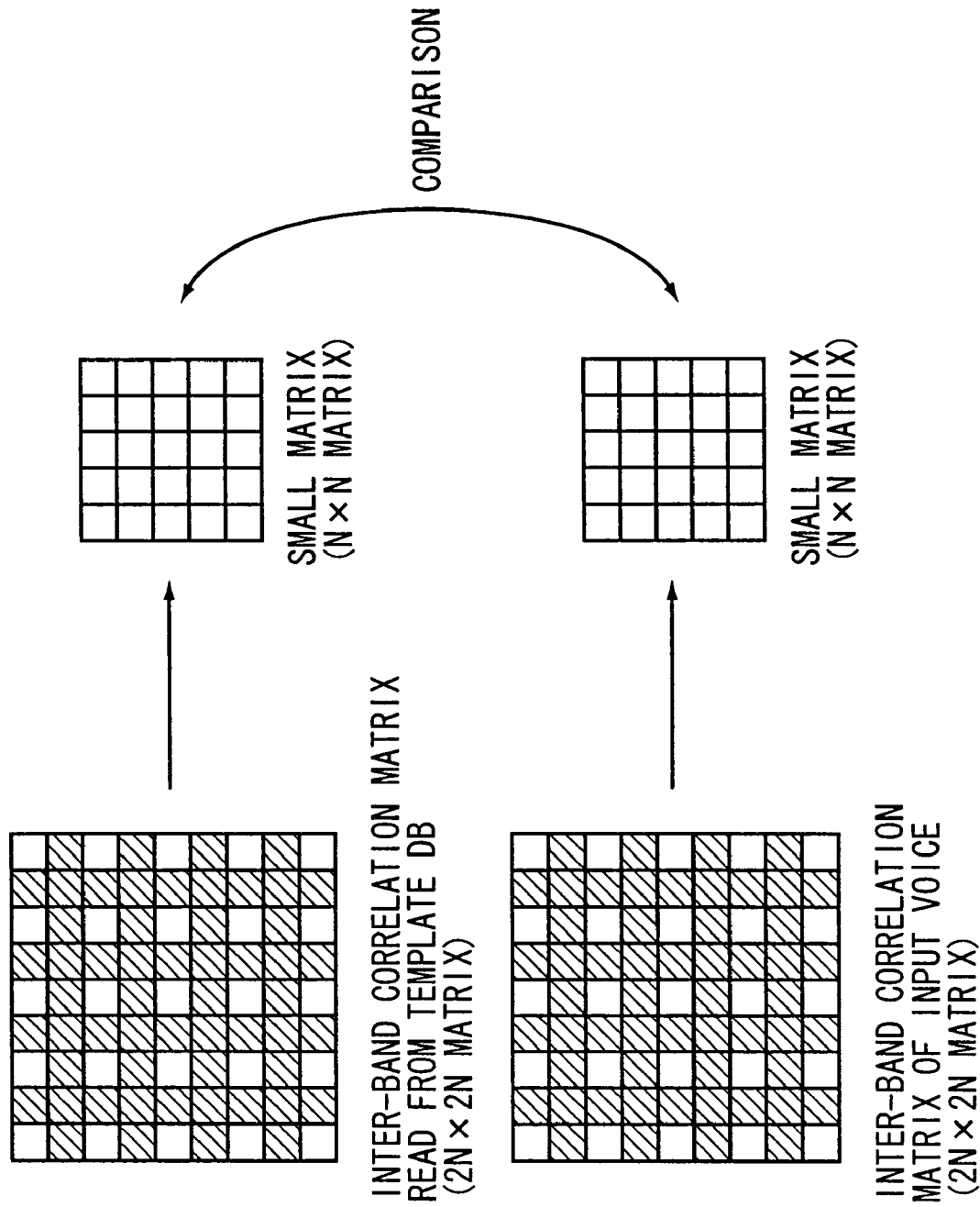

METHOD AND APPARATUS FOR ESTIMATING DEGREE OF SIMILARITY BETWEEN VOICES

BACKGROUND OF THE INVENTION

1. Technical Field of the Invention

The present invention relates to a technology for estimating the degree of similarity between voices using so-called inter-band correlation matrices, and relates to a technology for authenticating or identifying speakers using the estimation technology.

2. Description of the Related Art

To authenticate or identify a speaker, it is necessary to estimate the degree of similarity between a voice generated by the speaker and voices that have been previously obtained from specific speakers. In a general method for estimating the degree of similarity between voices, respective features of the voices to be compared are quantified into feature quantities, and the degree of similarity between the voices is estimated by comparing the feature quantities obtained from the voices. Non-Patent Reference 1 describes a technology in which inter-band correlation matrices are used as the feature quantities of voices to perform speaker identification. The inter-band correlation matrix obtained from a voice is a specific matrix whose elements are correlation values between envelope components of the voice in multiple bands into which the spectral data of the voice is divided. The contents of inter-band correlation matrices obtained respectively from voices uttered by speakers are not substantially affected by contents of the uttered voices and, instead, significantly depend on the speakers. Inter-band correlation matrices having similar contents are obtained from voices uttered by the same speaker, regardless of the contents of the uttered voices. Accordingly, speakers can be authenticated or identified using the inter-band correlation matrices as feature quantities of their voices.

[Non-Patent Reference 1] An article "TALKER IDENTIFICATION USING NARROW-BAND ENVELOPE CORRELATION MATRIX" published by KAZAMA MICHIKO, HIGASHIYAMA MIKIO, and YAMAZAKI YOSHIO in the Institute of Electronics, Information and Communication Engineers in March 2002.

[Non-Patent Reference 2] An article "Talker difference as they appear in correlation matrices of continuous speech spectra" published by K. -P. Li and G. W. Hughes, J. Acoust. Soc. Am., Vol. 55, No. 4, April 1974.

The inter-band correlation matrix used in the technology described in Non-Patent Reference 1 includes, as its elements, a number of correlation values between respective envelope components of the voice in a plurality of bands that are contiguous or continuous (not discrete) to each other along the frequency axis. However, the correlation between envelope components of the voice in frequency bands that are adjacent to each other along the frequency axis is high for any speaker who utters the voice. The inter-band correlation matrix used in Non-Patent Reference 1 includes elements which do not express differences between individuals, which causes a reduction in the accuracy of the estimation of the degree of similarity between voices.

SUMMARY OF THE INVENTION

Therefore, the present invention has been made in view of the above circumstances, and it is an object of the present invention to provide technical means for strongly reflecting individual differences between speakers who utter voices in feature quantities of the voices, thereby increasing the accuracy of the estimation of the degree of similarity between the voices.

The inventive similarity degree estimation method is carried out by an inter-band correlation matrix creation process of creating an inter-band correlation matrix from spectral data of an input voice such that the spectral data are divided into a plurality of discrete bands which are separated from each other with spaces therebetween along a frequency axis, a plurality of envelope components of the spectral data are obtained from the plurality of the discrete bands, and elements of the inter-band correlation matrix are correlation values between the respective envelope components of the input voice, and a similarity degree calculation process of calculating a degree of similarity between a pair of input voices to be compared with each other by using respective inter-band correlation matrices obtained for the pair of the input voices through the inter-band correlation matrix creation process.

Alternatively, the inventive similarity degree estimation method is carried out by an inter-band correlation matrix creation process of creating an inter-band correlation matrix from spectral data of an input voice such that the spectral data are divided into a plurality of bands arranged along a frequency axis, a plurality of envelope components of the spectral data are obtained from the plurality of the bands, and elements of the inter-band correlation matrix are correlation values between the respective envelope components of the input voice, and a similarity degree calculation process of constructing a pair of small matrices from a pair of inter-band correlation matrices which are composed of a predetermined number of rows and columns of elements and which correspond to a pair of input voices to be compared with each other such that the small matrix is constructed by extracting a reduced number of rows and columns of elements arranged at a given interval from the inter-band correlation matrix, and calculating a degree of similarity between the pair of the input voices using the respective small matrices.

According to the present invention, the contents of the two inter-band correlation matrices used to calculate the degree of similarity do not include elements which do not express differences between individuals. Accordingly, the accuracy of the estimation of the degree of similarity between voices can be increased using the inter-band correlation matrices.

Typical examples of implementation of the technology for estimating the degree of similarity between voices according to the present invention are speaker authentication and speaker identification. Details of this technology will become apparent from the following description of "Best Mode for Carrying Out the Invention".

BRIEF DESCRIPTION OF THE DRAWINGS

FIG. 2 is a block diagram of an inter-band correlation matrix creator used as a feature quantity extractor in the first embodiment.

FIG. 3 illustrates N bands in which components of a voice are extracted in the first embodiment.

FIG. 4 is a flow chart of an authentication process performed in the first embodiment.

FIG. 5 illustrates a method for comparing inter-band correlation matrices according to a second embodiment of the present invention.

BEST MODE FOR CARRYING OUT THE INVENTION

Embodiments of the present invention will now be described with reference to the accompanying drawings.

First Embodiment

Figure 1:
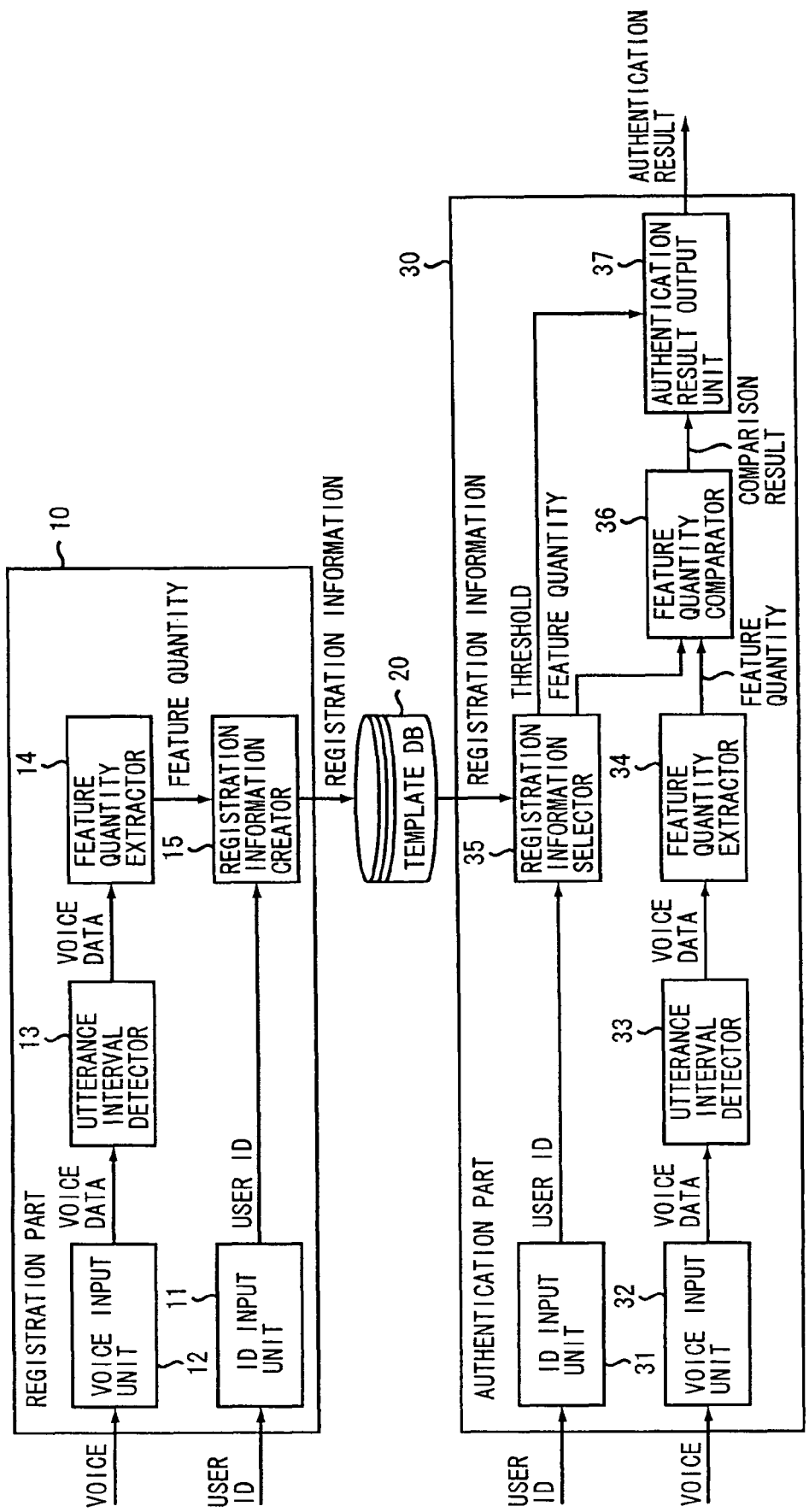
FIG. 1 is a block diagram of a speaker authentication apparatus according to a first embodiment of the present invention.

FIG. 1 is a block diagram of a speaker authentication apparatus according to an embodiment of the present invention. This speaker authentication apparatus mainly includes a registration part 10, a template database (DB) 20, and an authentication part 30.

The registration part 10 includes an ID input unit 11, a voice input unit 12, an utterance interval detector 13, a feature quantity extractor 14, and a registration information creator 15. The ID input unit 11 is a device that receives an ID of a user who has a legitimate right to receive a service and includes a keyboard or the like. The voice input unit 12 is a device that receives a voice of the user having the legitimate right. The voice input unit 12 includes, for example, a microphone and an A/D converter that converts an analog voice signal output from the microphone into a digital voice data. The utterance interval detector 13 is a device that monitors the level of voice data output from the voice input unit 12 and passes voice data in an utterance interval having a level that is equal to or higher than a threshold.

The feature quantity extractor 14 is a device that extracts a feature quantity from the voice data in the utterance interval which has passed through the utterance interval detector 13. In this embodiment, each user utters a plurality of sentences and the feature quantity extractor 14 extracts feature quantities from voices of the sentences uttered by the user. The registration information creator 15 associates a feature quantity obtained by averaging the extracted feature quantities with a user ID received by the ID input unit 11 and registers it as registration information in the template DB 20.

The authentication part 30 includes an ID input unit 31, a voice input unit 32, an utterance interval detector 33, a feature quantity extractor 34, a registration information selector 35, a feature quantity comparator 36, and an authentication result output unit 37. The ID input unit 31 is a device that receives an ID of a user to be authenticated and includes a keyboard or the like. The voice input unit 32 is a device that receives a voice of the user to be authenticated. Similar to the voice input unit 12, the voice input unit 32 includes a microphone and an A/D converter. The utterance interval detector 33 similar to the utterance interval detector 13 is provided downstream of the voice input unit 32.

The feature quantity extractor 34 is a device that extracts a feature quantity from voice data, which has passed through the utterance interval detector 33, using the same extraction method as that of the feature quantity extractor 14. The registration information selector 35 is a device that reads a feature quantity associated with a user ID received by the ID input unit 31 from the template DB 20 and outputs the feature quantity together with a predetermined threshold.

The feature quantity comparator 36 is a device that compares the feature quantity extracted by the feature quantity extractor 34 with the feature quantity read by the registration information selector 35 and outputs, as the comparison result, a degree of similarity between voices represented by the two feature quantities. The authentication result output unit 37 is a device that performs authentication to determine whether or not the user who has generated the voice received by the voice input unit 32 corresponds to the ID received by the ID input unit 31, by comparing the degree of similarity output from the feature quantity comparator 36 with a threshold output from the registration information selector 35, and then outputs the authentication result.

This embodiment is characterized by the configuration of each of the feature quantity extractors 14 and 34, the contents of inter-band correlation matrices which are feature quantities extracted by the extractors 14 and 34, and a feature quantity comparison method performed by the feature quantity comparator 36.

Any of the feature quantity extractors 14 and 34 includes an inter-band correlation matrix creator shown in FIG. 2. The inter-band correlation matrix creator includes a frequency analyzer 51, a band envelope creator 52, and a correlation value calculator 53. The frequency analyzer 51 performs Fast Fourier Transform (FFT) on voice data, which has passed through the utterance interval detector 13 or 33, on a frame by frame basis, each frame having a constant time length, and outputs an amplitude spectrum obtained through the FFT.

The band envelope creator 52 is a device that extracts respective components of the voice in a plurality of bands, which are arranged with intervals therebetween on the frequency axis, from the FFTed data from the frequency analyzer 51 and then creates respective envelopes of the components of the voice in the bands. More specifically, the band envelope creator 52 performs the following processes. First, the band envelope creator 52 extracts components of the voice in the first to Nth bands, which are arranged with intervals therebetween on the frequency axis as shown in FIG. 3, from the amplitude spectrum obtained from the frequency analyzer 51 and then converts the extracted components into values in dB. Then, the band envelope creator 52 obtains a change in the amplitude spectrum expressed in values in dB obtained respectively in frames for each of the first to Nth bands and outputs respective envelopes E-i (i=1~N) of the components of the voice in the first to Nth bands. The envelopes E-i (i=1~N) of the components of the voice in the bands may also be obtained by dividing an input voice into different bands using a filter bank including a plurality of band pass filters of different pass bands and then performing processes such as half-wave rectification and smoothing on respective signals of the bands which have passed through the filter bank.

The correlation value calculator 53 calculates a correlation value ajk between a j-th band envelope E-j and a kth band envelope E-k for every combination of (j,k) in the range of j and k, each ranging from 1 to N (i.e., j=1~N and k=1~N), and outputs an inter-band correlation matrix of N rows and N columns whose elements are the correlation values ajk (j=1~N and k=1~N).

The above description is that of the details of the configuration of each of the feature quantity extractors 14 and 34 and the contents of the inter-band correlation matrix extracted by the extractors 14 and 34.

Detailed and concrete description as to the computation of correlation values are given in the before mentioned Non- Patent Reference 2, the article "Talker difference as they appear in correlation matrices of continuous speech spectra" published by K. -P. Li and G. W. Hughes, J. Acoust. Soc. Am., Vol. 55, No. 4, April 1974. All of the contents of this article is herein incorporated in the specification by referencing to the article.

The feature quantity comparator 36 compares inter-band correlation matrices described above and calculates a degree of similarity between voices from which the inter-band correlation matrices have been extracted. In one preferred embodiment, the feature quantity comparator 36 obtains a correlation value between elements of two inter-band correlation matrices that are to be compared, for example, for each column of the matrices and outputs, as the degree of similarity, the average of the correlation values obtained for all columns. In another preferred embodiment, when "A" and "B" denote two inter-band correlation matrices to be compared, the feature quantity comparator 36 calculates the degree of similarity D according to the following Equation (1).

$$D = \sqrt{\operatorname{trace}(AB^{-1}) \cdot \operatorname{trace}(BA^{-1})}, \qquad (1)$$

In Equation (1), "trace ( )" denotes the sum of diagonal elements of a square matrix in parentheses.

FIG. 4 is a flow chart of an authentication process performed in this embodiment. In a process for authenticating a user, first, an ID of the user is obtained through the ID input unit 31 while voice data in an utterance interval of the user is obtained through the voice input unit 32 and the utterance interval detector 33 (step S11).

Then, through the feature quantity extractor 34, an inter-band correlation matrix A is created from the voice data obtained at step S11 (step S12) and an inter-band correlation matrix B associated with the ID obtained at step S11 is read from the template DB 20 through the registration information selector 35 (step S13).

Then, the feature quantity comparator 36 calculates a degree of similarity D based on the inter-band correlation matrices A and B (step S14) and the authentication result output unit 37 compares the calculated degree of similarity D with a threshold (step S15). If the degree of similarity D is equal to or higher than the threshold, the authentication result output unit 37 determines that the user who has uttered the voice is that person corresponding to the user ID (step S16). Otherwise, the authentication result output unit 37 determines that the user is an imposter (step S17). Then, the authentication result output unit 37 outputs the determination result.

In the embodiment described above, each of the two inter-band correlation matrices to be compared by the feature quantity comparator 36 has, as its elements, correlation values between the respective envelopes of the components of the voice in a plurality of bands which are arranged with intervals therebetween on the frequency axis. In the conventional technology, an inter-band correlation matrix whose elements are correlation values between envelopes of components of a corresponding voice in bands that are arranged without intervals on the frequency axis is obtained for each speaker and the inter-band correlation matrix is used as a feature quantity of the voice of the speaker. However, the correlation between envelopes of components of the voice in bands adjacent to each other is high for any speaker who utters the voice. This indicates that the inter-band correlation matrix used in the conventional technology also includes elements which do not express differences between individuals. However, the contents of the inter-band correlation matrices to be compared in this embodiment do not include elements which do not express differences between individuals. Thus, in this embodiment, differences between individuals are accentuated when comparing inter-band correlation matrices, thereby increasing the accuracy of the authentication.

Second Embodiment

Similar to the first embodiment, this embodiment relates to a speaker authentication apparatus. The speaker authentication apparatus of this embodiment has substantially the same configuration as that of the first embodiment. Differences of this embodiment from the first embodiment are a method for generating an inter-band correlation matrix in the feature quantity extractors 14 and 34 and a method for comparing inter-band correlation matrices in the feature quantity comparator 36.

In this embodiment, each of the feature quantity extractors 14 and 34 creates respective envelopes Ei (i=1~2N) of components in 1st to 2Nth bands which are arranged without intervals therebetween on the frequency axis, rather than the first to Nth bands which are arranged with intervals therebetween as shown in FIG. 3, from voice data which has passed through the utterance interval detector 13 or 33, and then creates a 2N×2N inter-band correlation matrix based on the created envelopes Ei (i=1~2N).

The feature quantity comparator 36 constructs respective small matrices of two inter-band correlation matrices to be compared by removing elements, which are arranged at predetermined row intervals and at predetermined column intervals, from the two inter-band correlation matrices and calculates a degree of similarity of the voices by comparing the two small matrices with each other. FIG. 5 shows one example. In this example, two small N×N matrices are constructed by removing elements of even rows and even columns from two 2N×2N inter-band correlation matrices to be compared and the degree of similarity of the voices is calculated by comparing the small N×N matrices with each other.

The elements of each of the small N×N matrices to be compared are correlation values between the respective envelopes of the components of the voice in the N bands which are arranged with intervals therebetween on the frequency axis.

Accordingly, this embodiment has the same advantages as those of the first embodiment.

Third Embodiment

Figure 6:
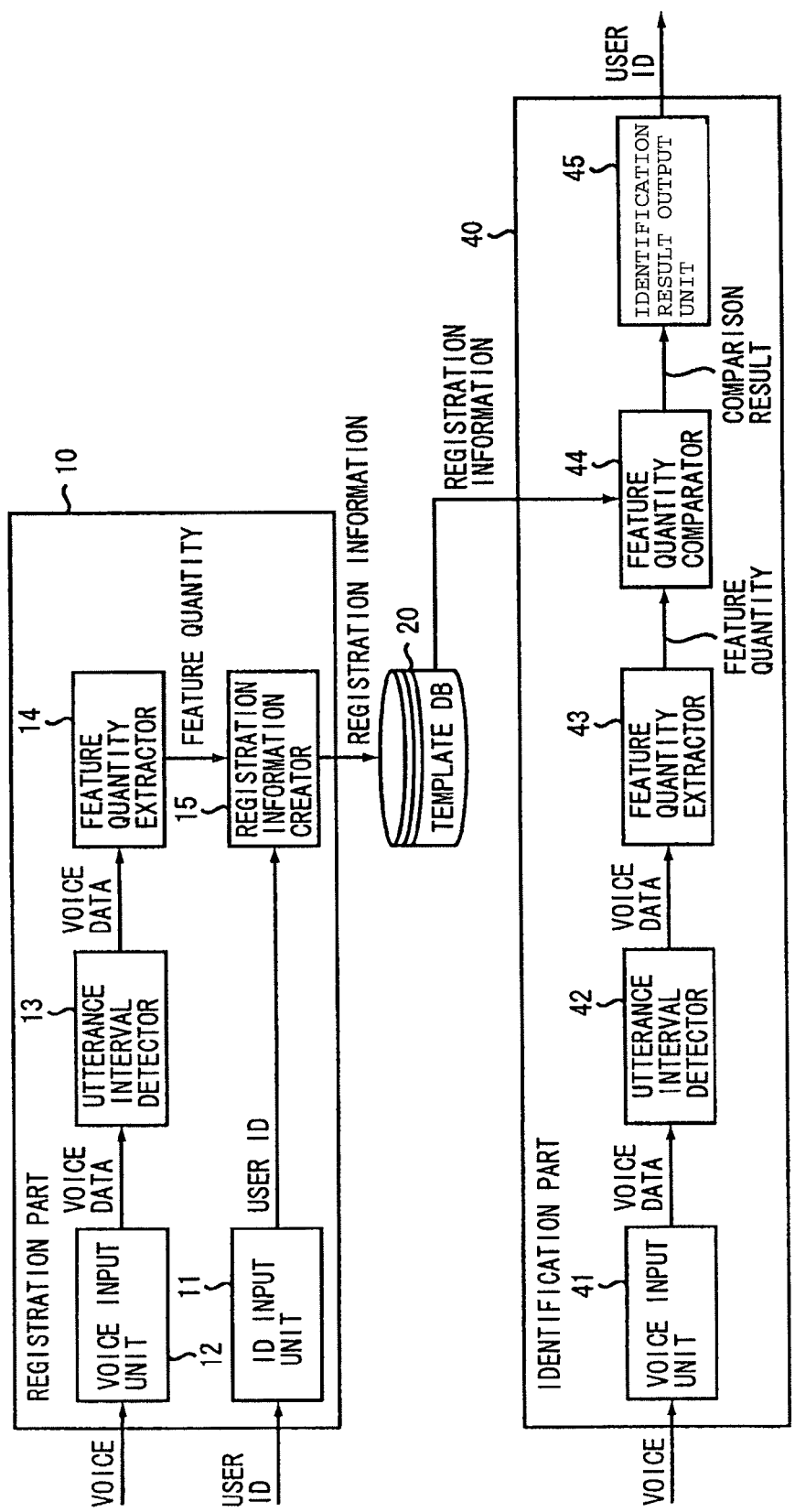
FIG. 6 is a block diagram of a speaker identification apparatus according to a third embodiment of the present invention.

FIG. 6 is a block diagram of a speaker identification apparatus according to a third embodiment of the present invention. This speaker identification apparatus includes a registration part 10 and a template DB 20 similar to those of the first embodiment shown in FIG. 1 and further includes an identification part 40 in place of the authentication part 30.

The identification part 40 includes a voice input unit 41, an utterance interval detector 42, a feature quantity extractor 43, a feature quantity comparator 44, and an identification result output unit 45. The voice input unit 41 is a device that receives a voice from a user to be identified and outputs its voice data. The utterance interval detector 42 is a device that detects and outputs data corresponding to an utterance interval included in the voice data output from the voice input unit 41. The feature quantity extractor 43 is a device that extracts a feature quantity from the voice data which has passed through the utterance interval detector 42. The feature quantity comparator 44 is a device that compares the feature quantity extracted by the feature quantity extractor 43 with feature quantities of users registered in the template DB 20 and outputs the degrees of similarity indicating the comparison results. The identification result output unit 45 is a device that selects a feature quantity, which has the highest degree of similarity to the feature quantity extracted by the feature quantity extractor 43, from feature quantities of users registered in the template DB 20 and outputs an ID of a user associated with the selected feature quantity.

The configuration of each of the feature quantity extractors 14 and 43, the contents of inter-band correlation matrices which are feature quantities extracted by the extractors 14 and 43, and a feature quantity comparison method performed by the feature quantity comparator 44 are similar to those of the first or second embodiment described above.

Figure 7:
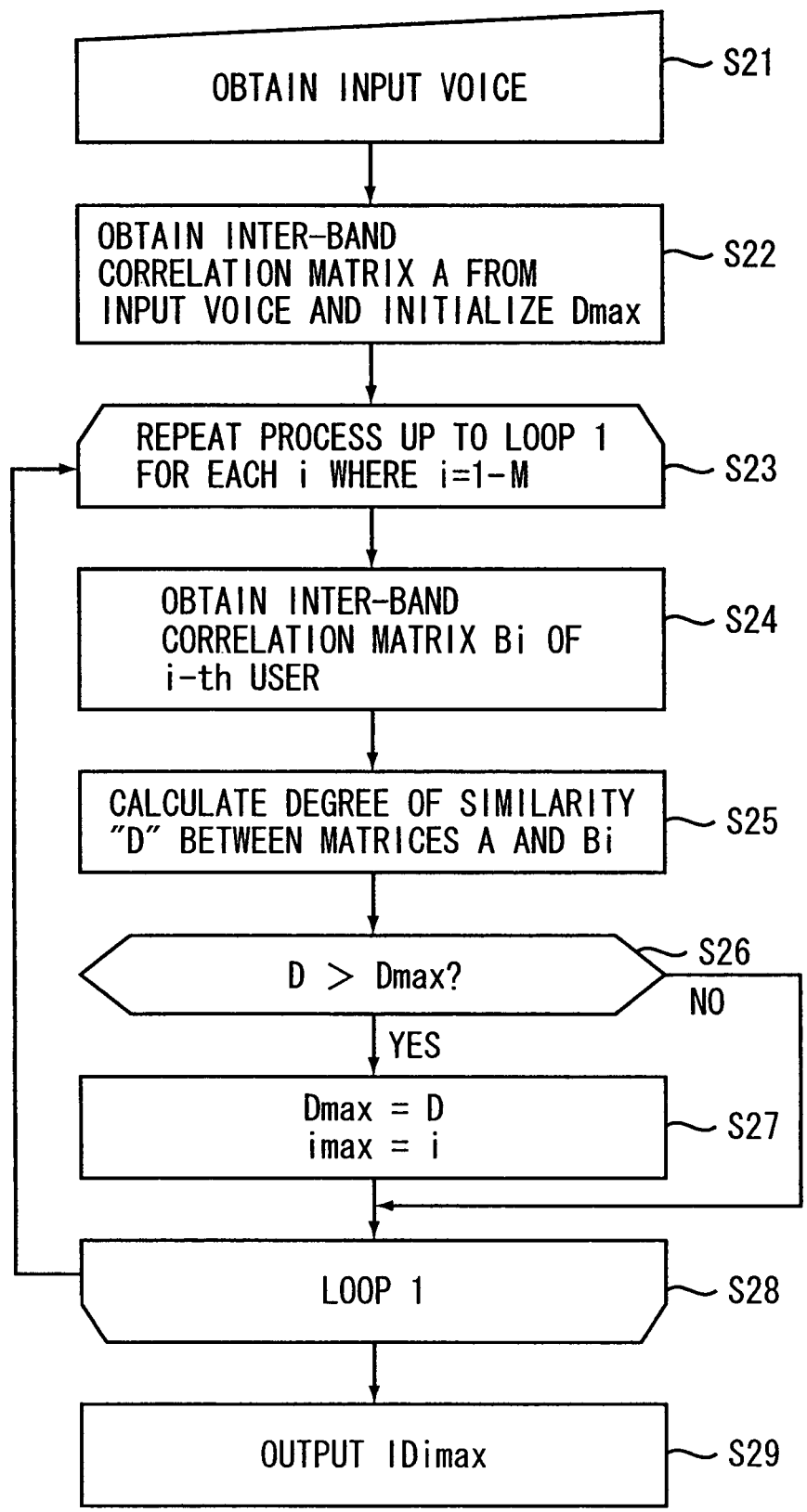
FIG. 7 is a flow chart of an identification process performed in the third embodiment.

FIG. 7 is a flow chart of an authentication process performed in this embodiment. In a process for identifying a user, first, voice data in an utterance interval of the user to be identified is obtained through the voice input unit 41 and the utterance interval detector 42 (step S21).

Then, through the feature quantity extractor 43, an inter-band correlation matrix A is created from the voice data obtained at step S21 (step S22). Here, the identification result output unit 45 initializes the highest degree of similarity Dmax to 0.

In this embodiment, when "M" denotes the number of inter-band correlation matrices registered in the template DB 20, a loop process of steps S23 to S28 is repeated for every i where i=1~M.

First, the feature quantity comparator 44 reads an inter-band correlation matrix Bi of an ith user from the template DB 20 (step S24). Then, the feature quantity comparator 44 calculates a degree of similarity D between the inter-band correlation matrix A obtained at step S22 and the inter-band correlation matrix Bi read at step S24 (step S25). Here, if each of the inter-band correlation matrices A and Bi, which are feature quantities, has elements corresponding to correlation values between respective envelopes of components of the voice in a plurality of bands which are arranged with intervals therebetween on the frequency axis as described above in the first embodiment, the feature quantity comparator 44 calculates the degree of similarity D using the inter-band correlation matrices A and Bi without change at step S25. On the other hand, if each of the inter-band correlation matrices A and Bi has elements corresponding to correlation values between respective envelopes of components of the voice in a plurality of bands which are arranged without intervals therebetween on the frequency axis, at step S25, the feature quantity comparator 44 performs row removal and column removal on each of the inter-band correlation matrices A and Bi to construct respective small matrices of the inter-band correlation matrices A and Bi and calculates the degree of similarity D using the small matrices as described above in the second embodiment. The identification result output unit 45 compares the degree of similarity D obtained in this manner with the highest degree of similarity Dmax (step S26). Only when D is higher than Dmax (i.e., D>Dmax), Dmax is set to D (i.e., Dmax=D) and imax is set to i (i.e., imax=i) (step S27).

Repeating the process for every i where i=1~M consequentially obtains an index imax of an inter-band correlation matrix Bimax which has the highest correlation with the inter-band correlation matrix obtained from the input voice among the M inter-band correlation matrices Bi (i=1~M) included in the template DB 20. The identification result output unit 45 outputs a user ID IDimax associated with the index imax as the identification result (step S29).

This embodiment operates in the above manner. Thus, this embodiment also has the same advantages as those of the first embodiment.

Fourth Embodiment

The feature quantity comparator 36 in the second embodiment calculates the degree of similarity of voices by extracting respective small matrices of one type from two inter-band correlation matrices to be compared using one type of extraction method (for example, by removing odd rows and odd columns or extracting elements of even rows and even columns from the inter-band correlation matrices) and then comparing the small matrices with each other. However, a plurality of types of methods may be used to extract respective small matrices from the two inter-band correlation matrices. The following is one example using a plurality of types of extraction methods. The feature quantity comparator 36 in this embodiment extracts a plurality of types of small matrices from each of the two inter-band correlation matrices obtained for two voices to be compared using a plurality of different types of extraction methods. Then, for each of the plurality of different types of extraction methods, the feature quantity comparator 36 performs a process for calculating the degree of similarity between two small matrices that have been extracted respectively from the inter-band correlation matrices of the two voices to be compared using the same type of extraction method. The feature quantity comparator 36 then calculates the degree of similarity between the two voices to be compared by performing comprehensive estimation (for example, obtaining the average) of the respective degrees of similarity between the small matrices obtained using the extraction methods. The similarity degree estimation method in this embodiment may be used for speaker authentication systems as illustrated in the first and second embodiments and may also be used for speaker identification systems as illustrated in the third embodiment.

Figure 8:
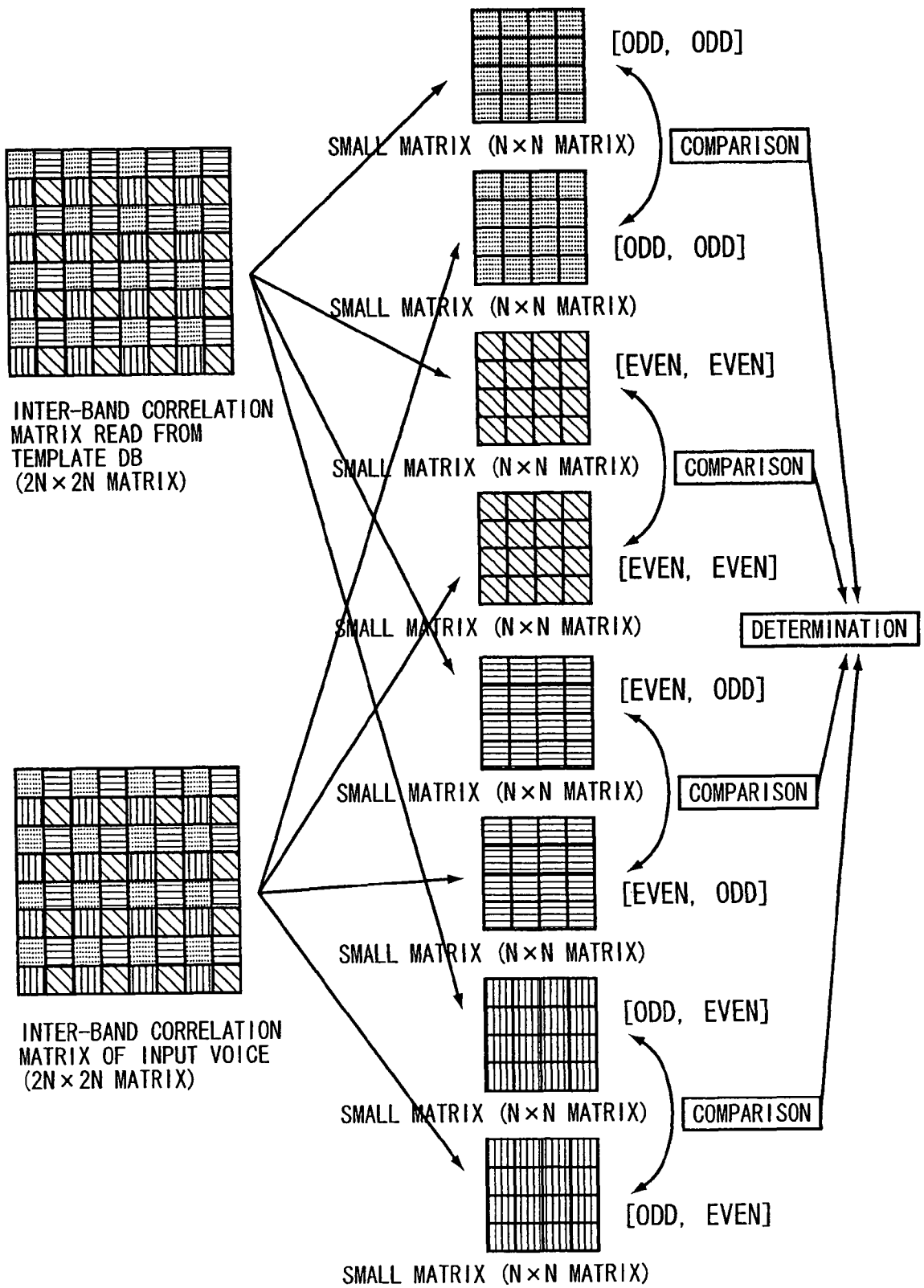
FIG. 8 illustrates a similarity degree calculation process performed by a feature quantity comparator in a fourth embodiment of the present invention.

FIG. 8 illustrates an example of the similarity degree calculation process performed by the feature quantity comparator 36 in this embodiment. In this example, the feature quantity comparator 36 extracts two small matrices respectively from an inter-band correlation matrix of an input voice and an inter-band correlation matrix read from the template DB 20 using the following four extraction methods.

(a) extraction of elements of odd columns and odd rows
(b) extraction of elements of even columns and even rows
(c) extraction of elements of even columns and odd rows
(d) extraction of elements of odd columns and even rows The feature quantity comparator 36 compares two small matrices of each pair of small matrices extracted using the same extraction method, among small matrices extracted from two inter-band correlation matrices using four types of extraction methods in the above manner, and calculates the degree of similarity between the two small matrices of each pair. Consequently, the feature quantity comparator 36 obtains four degrees of similarity. The feature quantity comparator 36 obtains, for example, the average of the four similarity degrees and determines the average to be the conclusive degree of similarity between of the two voices to be compared. This method is expected to provide more accurate estimation of the degree of similarity than the second embodiment.

Although, in the above example, four types of small matrices are constructed by extracting one element from each set of elements of two consecutive rows and two consecutive columns in the original inter-band correlation matrix, small matrices may also be constructed by extracting one element from each set of elements of m consecutive rows and m consecutive columns with m greater than 2 (m>2). For example, when one element is extracted from each set of elements of 3 consecutive rows and 3 consecutive columns, 9 types of small matrices can be extracted from the original inter-band correlation matrix. In this case, of 9 types of small matrices extracted from an inter-band correlation matrix of an input voice and 9 types of small matrices extracted from an inter-band correlation matrix of the template DB 20, two small matrices of each pair of small matrices obtained using the same type of extraction method are compared with each other and, for example, the average of the respective degrees of similarity between the two small matrices of the 9 pairs of small matrices is determined to be the degree of similarity of the voices.

<Confirmation of Advantages of Embodiments>

To confirm the advantages of the above embodiments, the present inventors constructed a speaker identification system as that of the third embodiment shown in FIG. 6 and carried out speaker identification tests using the system. An inter-band correlation matrix was created with voices collected from each person of a group of 25 males and a group of 28 females per test. The template DB 20 was created in advance. To create an inter-band correlation matrix, the feature quantity extractor 14 obtains respective envelopes of a voice signal in bands using a filter bank including a plurality of BPFs and LPFs without performing FFT. The feature quantity extractor 43 uses the same method for creating an inter-band correlation matrix of an input voice. In the test, for each of the male and female groups, speaker identification was performed by providing a voice of a person in the group to the voice input unit 41 and then an identification rate, which is the success rate of the identification, was obtained. Here, the dependency of the identification rate on the interval between elements extracted for obtaining small matrices for use in calculating the degree of similarity between two inter-band correlation matrices to be compared by the feature quantity comparator 44 was obtained by changing the extraction interval.

Figure 9:
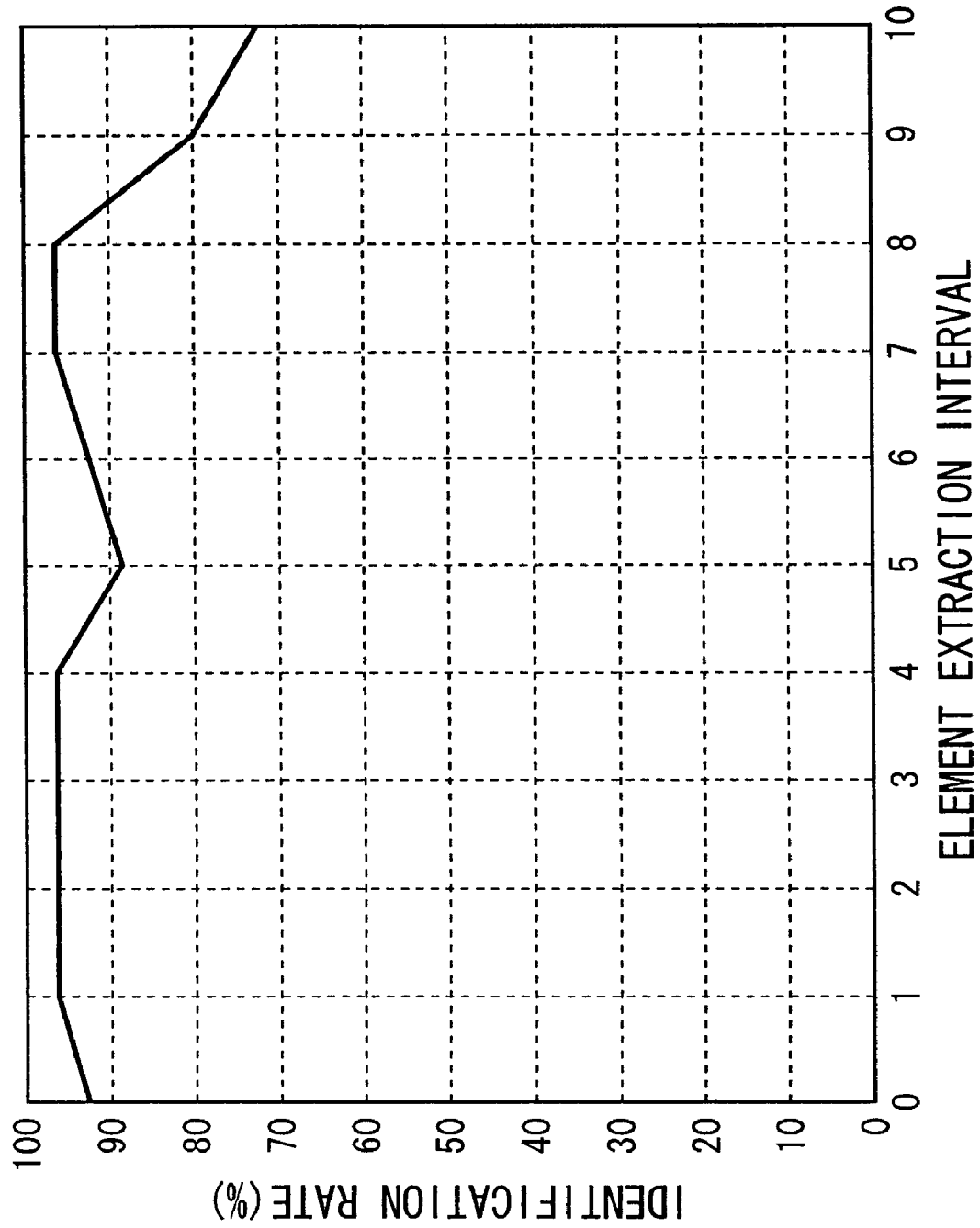
FIG. 9 illustrates advantages of the embodiments of the present invention.
Figure 10:
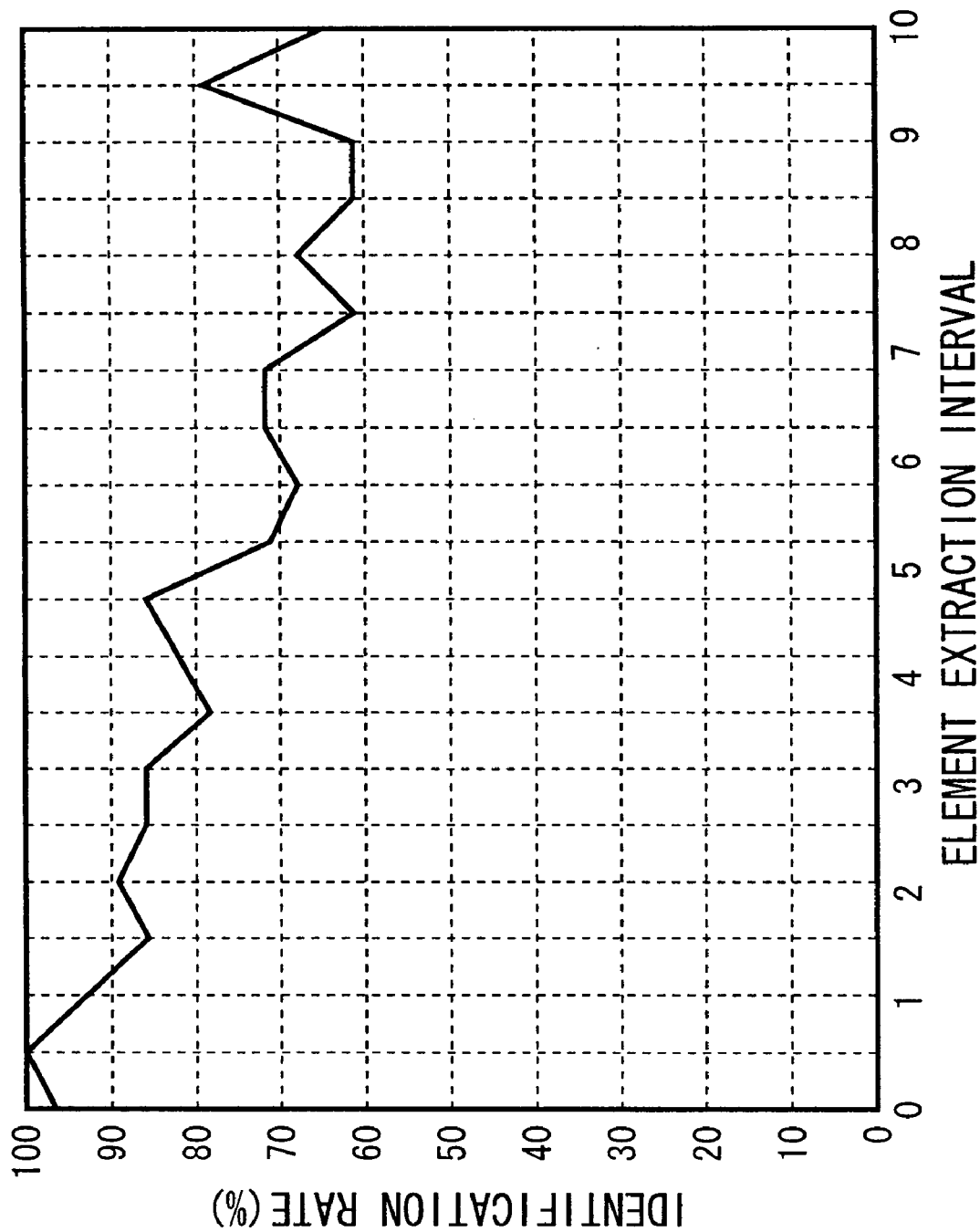
FIG. 10 illustrates advantages of the embodiments of the present invention.

FIG. 9 illustrates the dependency of the identification rate on the extraction interval for 25 males and FIG. 10 illustrates the dependency of the identification rate on the extraction interval for 28 females. In FIGS. 9 and 10, the identification rate for an extraction interval of "0" is the identification rate of each speaker when the feature quantity comparator 44 outputs the degree of similarity between an inter-band correlation matrix of an input voice and an inter-band correlation matrix of the template DB 20 without performing element extraction on the two inter-band correlation matrices. The identification rate for an extraction interval of "1" is the identification rate of each speaker obtained when the feature quantity comparator 44 outputs the degree of similarity between the two inter-band correlation matrices to be compared by extracting elements at intervals of one row and at intervals of one column from the two inter-band correlation matrices. As described above in the fourth embodiment, there are four types of methods for obtaining small matrices from the original inter-band correlation matrix by extracting elements at intervals of one row and at intervals of one column from the original inter-band correlation matrix. Thus, the feature quantity comparator 34 obtains small matrices from two inter-band correlation matrices using the methods of (a) and (b) and obtains the degrees of similarity between the small matrices and then determines that the average of the degrees of similarity is the conclusive degree of similarity between the voices. Similarly, the identification rate for an extraction interval of "k" is an identification rate obtained when the feature quantity comparator 44 calculates the degree of similarity between two voices to be compared by extracting elements at intervals of k rows and at intervals of k columns from two inter-band correlation matrices.

As shown in FIGS. 9 and 10, the test results show that calculating the degree of similarity between voices to be compared by extracting rows and columns from inter-band correlation matrices of the voices improves the speaker identification rate, compared to when calculating the degree of similarity using the inter-band correlation matrices without change.

Although the variety of embodiments of the present invention have been described above, other embodiments are also possible. The following are examples.

(1) In the first embodiment, each of the width of each of the 1st to Nth bands and the interval between neighboring ones of the bands may be the same or may also be different from each other.

(2) In the second embodiment, respective envelopes of components of an input voice in a plurality of bands that are arranged without intervals therebetween on the frequency axis are obtained from the input voice and an inter-band correlation matrix, whose elements are correlation values between the respective envelopes in the plurality of bands, is used as a feature quantity. However, envelopes of components of a voice from which the inter-band correlation matrix is created are not necessarily envelopes of components of the voice in the plurality of bands that are arranged without intervals therebetween on the frequency axis and may also be envelopes of components of the voice in a plurality of bands that are arranged with intervals therebetween.

(3) Although the registration part 10 is provided as a device separated from the authentication part 30 in the speaker authentication apparatus in the first and second embodiments, the function of the registration part 10 may be incorporated into the authentication part 30 to allow the user to register an inter-band correlation matrix of their voice used for authentication in the template DB 20 through the authentication part 30. Similarly, the function of the registration part 10 may be incorporated into the identification part 40 in the speaker identification apparatus in the third embodiment.

The invention claimed is:

1. A similarity degree estimation method comprising:
    an inter-band correlation matrix creation process of creating an inter-band correlation matrix from spectral data of an input voice received from a voice input unit such that the spectral data are divided into a plurality of discrete bands which are separated from each other with spaces therebetween along a frequency axis, a plurality of envelope components of the spectral data are obtained from the plurality of the discrete bands, and elements of the inter-band correlation matrix are correlation values between the respective envelope components of the input voice; and
    a similarity degree calculation process of calculating a degree of similarity between a pair of input voices to be compared with each other by using respective inter-band correlation matrices obtained for the pair of the input voices through the inter-band correlation matrix creation process.

2. A similarity degree estimation method comprising:
    an inter-band correlation matrix creation process of creating an inter-band correlation matrix from spectral data of an input voice received from a voice input unit such that the spectral data are divided into a plurality of bands arranged along a frequency axis, a plurality of envelope components of the spectral data are obtained from the plurality of the bands, and elements of the inter-band correlation matrix are correlation values between the respective envelope components of the input voice; and a similarity degree calculation process of constructing a pair of small matrices from a pair of inter-band correlation matrices which are composed of a predetermined number of rows and columns of elements and which correspond to a pair of input voices to be compared with each other such that the small matrix is constructed by extracting a reduced number of rows and columns of elements arranged at a given interval from the inter-band correlation matrix, and calculating a degree of similarity between the pair of the input voices using the respective small matrices.

3. A similarity degree estimation apparatus comprising:
an inter-band correlation matrix creation part that creates an inter-band correlation matrix from spectral data of an input voice such that the spectral data are divided into a plurality of discrete bands which are separated from each other with spaces along a frequency axis, a plurality of envelope components of the spectral data are obtained from the plurality of the discrete bands, and elements of the inter-band correlation matrix are correlation values between the respective envelope components of the input voice; and
a similarity degree calculation part that calculates a degree of similarity between a pair of input voices to be compared with each other by using respective inter-band correlation matrices obtained for the pair of the input voices through the inter-band correlation matrix creation part.

4. A similarity degree estimation apparatus comprising:
an inter-band correlation matrix creation part that creates an inter-band correlation matrix from spectral data of an input voice such that the spectral data are divided into a plurality of bands arranged along a frequency axis, a plurality of envelope components of the spectral data are obtained from the plurality of the bands, and elements of the inter-band correlation matrix are correlation values between the respective envelope components of the input voice; and
a similarity degree calculation part that constructs a pair of small matrices from a pair of inter-band correlation matrices which are composed of a predetermined number of rows and columns of elements and which correspond to a pair of input voices to be compared with each other such that the small matrix is constructed by extracting a reduced number of rows and columns of elements arranged at a given interval from the inter-band correlation matrix, and calculating a degree of similarity between the pair of the input voices using the respective small matrices.

5. The similarity degree estimation apparatus according to claim 4, wherein the similarity degree calculation part obtains different types of the small matrix from the inter-band correlation matrix by extracting the reduced number of rows and columns of elements from different positions of the inter-band correlation matrix, performs a process of calculating each degree of the similarity between the pair of the small matrices for each of the different types of the small matrix, and then performs comprehensive estimation of the respective degrees of the similarity obtained for the different types of the small matrix.

6. A speaker authentication apparatus comprising:
a database that stores a reference inter-band correlation matrix as a feature quantity of a voice of one or more user in correspondence to an ID of each user, the reference inter-band correlation matrix being obtained from spectral data of the voice of each user such that the spectral data are divided into a plurality of discrete bands which are separated from each other with spaces therebetween along a frequency axis, a plurality of envelope components of the spectral data are obtained from the plurality of the discrete bands, and elements of the reference inter-band correlation matrix are correlation values between the respective envelope components of the voice of each user;
an ID input unit that receives an ID of a target user to be authenticated;
a voice input unit that receives a voice of the target user to be authenticated;
a feature quantity extractor that creates a target inter-band correlation matrix from spectral data of the received voice of the target user such that the spectral data are divided into a plurality of discrete bands which are separated from each other with spaces therebetween along a frequency axis, a plurality of envelope components of the spectral data are obtained from the plurality of the discrete bands, and elements of the target inter-band correlation matrix are correlation values between the respective envelope components of the received voice of the target user;
a registration information selector that retrieves the reference inter-band correlation matrix corresponding to the ID of the target user received through the ID input unit from the database;
a feature quantity comparator that calculates a degree of similarity between the target inter-band correlation matrix created by the feature quantity extractor and the reference inter-band correlation matrix retrieved by the registration information selector; and
an authentication result output unit that performs authentication to determine whether or not the target user who has generated the voice received by the voice input unit corresponds to the ID received by the ID input unit based on the degree of similarity calculated by the feature quantity comparator, and that outputs authentication results.

7. A speaker authentication apparatus comprising:
a database that stores a reference inter-band correlation matrix as a feature quantity of a voice of one or more user in correspondence to an ID of each user, the reference inter-band correlation matrix being created from spectral data of the voice of each user such that the spectral data are divided into a plurality of bands arranged along a frequency axis, then a plurality of envelope components of the spectral data are obtained from the plurality of the bands, and elements of the reference inter-band correlation matrix are correlation values between the respective envelope components of the voice of each user;
an ID input unit that receives an ID of a target user to be authenticated;
a voice input unit that receives a voice of the target user to be authenticated;
a feature quantity extractor that extracts a target inter-band correlation matrix from spectral data of the received voice of the target user such that the spectral data are divided into a plurality of bands arranged along a frequency axis, a plurality of envelope components of the spectral data are obtained from the plurality of the bands, and elements of the target inter-band correlation matrix are correlation values between the respective envelope components of the received voice;

a registration information selector that retrieves the reference inter-band correlation matrix corresponding to the ID of the target user received through the ID input unit from the database;

a feature quantity comparator that constructs a pair of small matrices from the pair of the target and reference inter-band correlation matrices which are composed of a predetermined number of rows and columns of elements such that the small matrix is constructed by extracting a reduced number of rows and columns of elements arranged at a given interval from the inter-band correlation matrix, and that calculates a degree of similarity between the pair of the small matrices; and an authentication result output unit that performs authentication to determine whether or not the target user who has generated the voice received by the voice input unit corresponds to the ID received by the ID input unit, based on the degree of similarity calculated by the feature quantity comparator, and then outputs the authentication result.

8. A speaker identification apparatus comprising:

a database that stores a reference inter-band correlation matrix as a feature quantity of a voice of one or more user in correspondence to an ID of each user, the reference inter-band correlation matrix being obtained from spectral data of the voice of each user such that the spectral data are divided into a plurality of discrete bands which are separated from each other with spaces therebetween along a frequency axis, a plurality of envelope components of the spectral data are obtained from the plurality of the discrete bands, and elements of the reference inter-band correlation matrix are correlation values between the respective envelope components of the voice of each user;

a voice input unit that receives a voice of a target user to be recognized;

a feature quantity extractor that creates a target inter-band correlation matrix from spectral data of the received voice of the target user such that the spectral data are divided into a plurality of discrete bands which are separated from each other with spaces therebetween along a frequency axis, a plurality of envelope components of the spectral data are obtained from the plurality of the discrete bands, and elements of the target inter-band correlation matrix are correlation values between the respective envelope components of the received voice of the target user;

a feature quantity comparator that calculates each degree of similarity between the target inter-band correlation matrix created by the feature quantity extractor and each reference inter-band correlation matrix of each user stored in the database; and an identification result output unit that selects an optimal reference inter-band correlation matrix, which has the highest degree of similarity to the target inter-band correlation matrix created by the feature quantity extractor, from the reference inter-band correlation matrices stored in the database based on each degree of similarity calculated by the feature quantity comparator, and that outputs an ID corresponding to the selected reference inter-band correlation matrix.

9. A speaker identification apparatus comprising:

a database that stores a reference inter-band correlation matrix as a feature quantity of a voice of one or more user in correspondence to an ID of each user, the reference inter-band correlation matrix being obtained from spectral data of the voice of each user such that the spectral data are divided into a plurality of bands along a frequency axis, a plurality of envelope components of the spectral data are obtained from the plurality of the bands, and elements of the reference inter-band correlation matrix are correlation values between the respective envelope components of the voice of each user;

a voice input unit that receives a voice of a target user to be recognized;

a feature quantity extractor that creates a target inter-band correlation matrix from spectral data of the received voice of the target user such that the spectral data are divided into a plurality of bands along a frequency axis, a plurality of envelope components of the spectral data are obtained from the plurality of the bands, and elements of the target inter-band correlation matrix are correlation values between the respective envelope components of the received voice of the target user;

a feature quantity comparator that constructs each pair of small matrices from each pair of the target inter-band correlation matrix and each reference inter-band correlation matrix which are composed of a predetermined number of rows and columns of elements such that each small matrix is constructed by extracting a reduced number of rows and columns of elements arranged at a given interval from the inter-band correlation matrix, and that calculates each degree of similarity between each pair of the small matrices; and an identification result output unit that selects an optimal reference inter-band correlation matrix, which has the highest degree of similarity to the target inter-band correlation matrix created by the feature quantity extractor, from the reference inter-band correlation matrices stored in the database, based on each degree of similarity calculated by the feature quantity comparator, and that outputs an ID corresponding to the selected reference inter-band correlation matrix.

* * * * *